Sept. 11, 1928.                       1,684,218
              A. D. GALLAGHER
                  CULTIVATOR
         Original Filed July 23, 1924
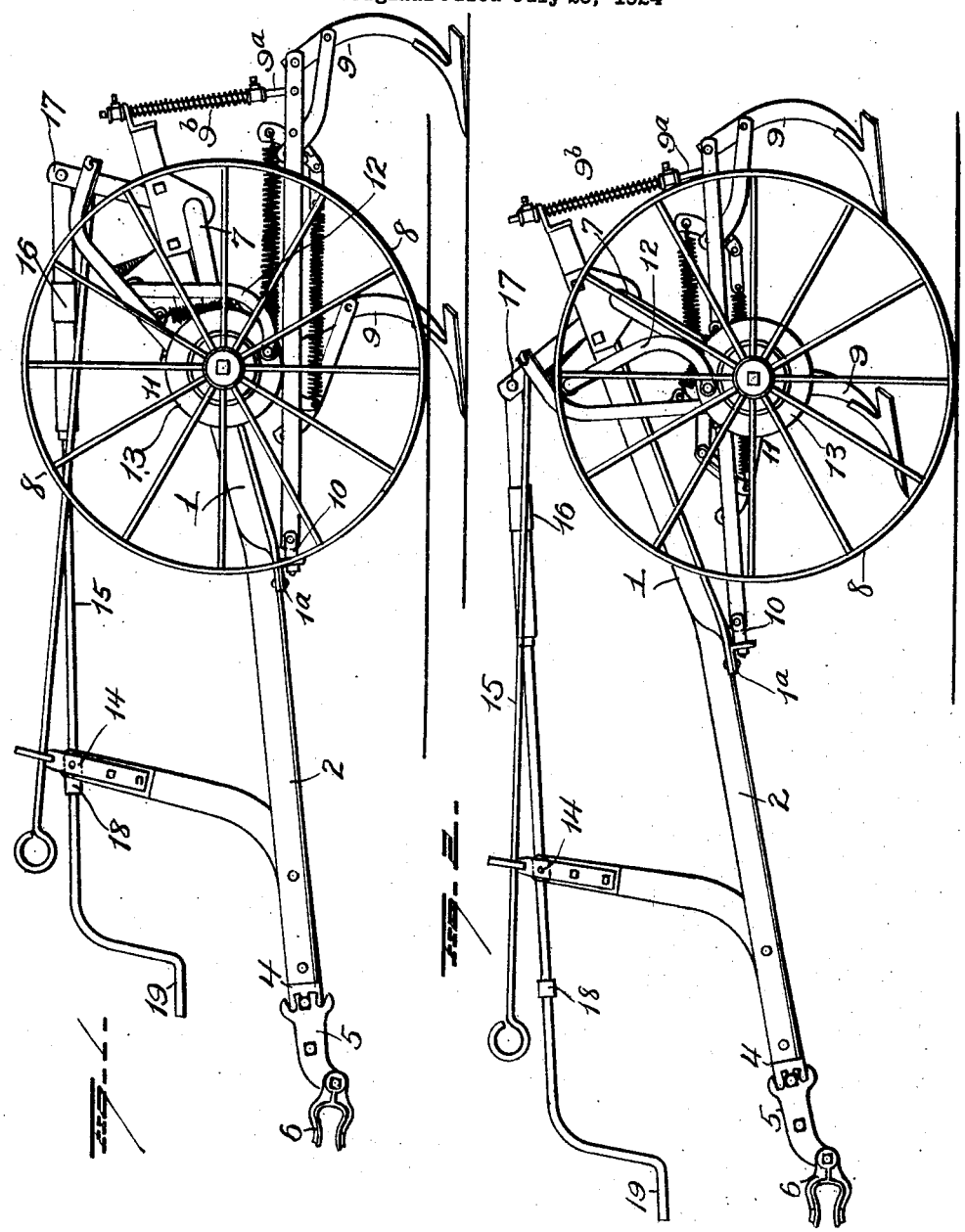
Inventor
A. D. Gallagher
By Seymour & Bright
Attorneys Patented Sept. 11, 1928.

1,684,218

UNITED STATES PATENT OFFICE.

ARTHUR D. GALLAGHER, OF SOUTH BEND, INDIANA, ASSIGNOR TO OLIVER CHILLED PLOW WORKS, OF SOUTH BEND, INDIANA.

CULTIVATOR.

Original application filed July 23, 1924, Serial No. 727,743. Divided and this application filed October 7, 1925. Serial No. 61,111.

This invention relates to improvements in cultivators, this application being a division of application filed by me on the 23rd day of July 1924, and designated by Serial No. 727,743.

The object of the present invention is to provide simple and efficient means for adjusting the shovels of a cultivator for depth of penetration into the soil without materially changing the suction of the shovels.

With this and other objects in view, the invention consists in certain novel features of construction and combinations of parts as hereinafter set forth and pointed out in the claims.

In the accompanying drawings;

Figure 1 is a view in side elevation showing the parts in normal working positions and, Figure 2 is a similar view showing the frame and shovel gangs in raised position.

The cultivator embodies a unitary frame 1, including longitudinal beams 2, having a draw bar 4 secured at their forward ends, and to said draw bar, jaws 5 are adjustably connected and with which, a clevis 6 is connected.

A crank axle 7 is mounted in suitable bearings on the longitudinal bars 2 of the frame and the spindle portions of said axle enter the hubs of carrying wheels such as indicated at 8 so that said wheels will be loosely mounted on the axle spindles.

The beams of cultivator gangs 9 are pivotally connected with the front bar 1ª of the frame, through the medium of brackets 10 swivelled to said front bar. The rear portions of the gangs are connected with the rear portion of the frame through the medium of rods 9ª and springs 9ᵇ as fully described in my copending application hereinbefore identified.

Both shovel gangs may be raised simultaneously when the cultivator is to be transported from place to place, by means of power-lift mechanism operable from one of the carrying wheels. In the present instance, I have shown clutch mechanism indicated at 11 for connecting one of the carrying wheels 8 with the frame through the medium of lifting members 12—13, so that when said wheel is locked to the lifting member 12, the frame and the cultivator gangs connected therewith will be raised, as will be readily understood.

A standard near the forward end of the frame supports a pivoted sleeve 14 and through this sleeve, a screw shaft 15 passes freely.

To provide simple and efficient means for raising or lowering the frame of the cultivator sufficiently to effect adjustment of depth penetration of the earth-working members, the devices now to be explained may be employed: The threaded rear portion of the shaft 15 enters a tubular housing 16 having internal threads to receive it and the rear end of said housing is pivotally attached to an arm 17 secured to and projecting upwardly from the crank-axle 7. When the cultivator frame is raised by the power lift to elevate the gangs, the arm 17, the screw housing 16 and the screw shaft 15 will move forwardly, the latter passing freely through the sleeve or knuckle 14, but when the parts are in their normal working positions rearward movement of the parts 15, 16 and 17 will be limited by a collar 18 secured to the screw shaft 15 and abutting against the sleeve or knuckle 14. The forward end of the screw shaft 15 is provided with a crank-handle 19 to facilitate the turning of said shaft. When the screw shaft 15 is turned in one direction, motion will be transmitted through the screw housing 16 and the arm 17 to the crank-axle 7 to turn the latter sufficiently to so raise the frame and cultivator gangs as to effect depth adjustment of the latter. It will be understood that rotation of shaft 15 in the reverse direction will cause lowering of the frame and cultivator gangs.

Having fully described my invention what I claim as new and desire to secure by Letters Patent, is;—

1. In a cultivator, the combination with a frame, a crank-axle supporting the rear portions of the frame, and carrying wheels, of an arm rigid with the intermediate cranked portion of the crank-axle and extending angularly therefrom, a standard rigid with the frame in advance of the axle, a sleeve pivotally supported by said standard, an internally threaded screw member connected to said arm, a screw shaft passing freely through said pivoted sleeve and cooperating with said threaded screw member to effect depth adjustment by raising or lowering the cranked portion of the axle, means for raising or lowering the frame, and a stop on said screw shaft to engage the pivoted sleeve and limit rearward movement of the shaft when the frame is actuated by said frame raising and lowering means.

2. In a cultivator, the combination of a frame, a standard rigid with the forward portion of the frame, a sleeve pivotally supported by said standard, a crank-axle carrying the frame, carrying wheels, an arm projecting upwardly from said crank-axle and rigid therewith, an internally threaded screw member pivoted to said arm, a screw shaft entering said screw member and capable of free rotary and longitudinal movement relatively to the pivoted sleeve through which it passes, a stop on the screw shaft to engage the forward end of the pivoted sleeve, and a manually operable member at the forward end of said screw shaft.

3. In a cultivator, the combination with a frame, a crank axle carrying the frame, carrying wheels, cultivator gangs connected with said frame, and means for raising the frame to raise the cultivator gangs, of depth adjusting means for the cultivator gangs, said means comprising an arm rigid with the intermediate cranked portion of the crank axle, an internally threaded member connected with said arm, a manually operable screw shaft entering said internally threaded member, a standard, a sleeve pivotally supported by said standard, said shaft being freely movable in said sleeve when the frame is raised or lowered, and means for limiting the longitudinal movement of said shaft in one direction.

In testimony whereof, I have signed this specification.

ARTHUR D. GALLAGHER.